(12) United States Patent
Liang et al.

(10) Patent No.: US 11,856,455 B2
(45) Date of Patent: Dec. 26, 2023

(54) DYNAMIC FREQUENCY ALLOCATION METHOD FOR BASE STATION, SHELF LABEL SYSTEM AND COMPUTER DEVICE

(71) Applicant: HANSHOW TECHNOLOGY CO.,LTD., Jiaxing (CN)

(72) Inventors: Min Liang, Jiaxing (CN); Qi Jiang, Jiaxing (CN); Yaping Ji, Jiaxing (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/144,840

(22) Filed: May 8, 2023

(65) Prior Publication Data

US 2023/0362726 A1  Nov. 9, 2023

(30) Foreign Application Priority Data

May 9, 2022  (CN) .......................... 202210496841.0

(51) Int. Cl.
*H04W 28/086* (2023.01)
*H04W 72/0453* (2023.01)
*H04W 72/56* (2023.01)

(52) U.S. Cl.
CPC ... *H04W 28/0861* (2023.05); *H04W 72/0453* (2013.01); *H04W 72/56* (2023.01)

(58) Field of Classification Search
None
See application file for complete search history.

(56) References Cited

U.S. PATENT DOCUMENTS

| | | | | |
|---|---|---|---|---|
| 2013/0343326 A1* | 12/2013 | Kivinen | .................. | H04B 7/12 370/329 |
| 2021/0058934 A1* | 2/2021 | Jiang | ..................... | H04W 72/30 |
| 2022/0405695 A1* | 12/2022 | Bowman | ................ | G06Q 10/08 |

FOREIGN PATENT DOCUMENTS

| | | |
|---|---|---|
| CN | 108684026 A | 10/2018 |
| CN | 109831753 A | 5/2019 |
| CN | 112105004 A | 12/2020 |
| CN | 113347722 A | 9/2021 |
| CN | 113988237 A | 1/2022 |
| WO | 20200238428 A1 | 12/2020 |

OTHER PUBLICATIONS

First CNOA and Search Report issued in Application No. 202210496841.0 dated Jun. 22, 2022 with English translation,(11p).

* cited by examiner

*Primary Examiner* — Saba Tsegaye
(74) *Attorney, Agent, or Firm* — Arch & Lake LLP

(57) ABSTRACT

A dynamic frequency allocation method for base stations, a shelf label system and a computer device are provided. The method includes: obtaining a current connectivity structure of base stations; obtaining a current weight degree of each base station based on a frequency interval weight between base stations in the current connectivity structure; performing priority classification on all current base stations to obtain a current priority type of each base station; and obtaining a current allocated frequency of each base station based on the current priority type of the base station, the current weight degree of the base station, the frequency interval weight and a current available frequency set.

20 Claims, 3 Drawing Sheets

DYNAMIC FREQUENCY ALLOCATION METHOD FOR BASE STATION, SHELF LABEL SYSTEM AND COMPUTER DEVICE

CROSS-REFERENCE TO RELATED APPLICATIONS

This application is filed based upon and claims priority to Chinese Patent Application No. 202210496841.0, filed on May 9, 2022, which is hereby incorporated by reference in its entirety for all purposes.

TECHNICAL FIELD

The present disclosure relates to a field of communication technology, and particularly, to a dynamic frequency allocation method for a base station, a shelf label system and a computer device.

BACKGROUND

With the increasing application of the electronic shelf label system in various retail fields and the increasing scale of stores, a plurality of base stations need to be deployed in the stores. Due to the limited frequency resources of the 2.4G ISM frequency band, currently in the field of electronic shelf label systems, fixed frequencies are usually manually allocated to a plurality of base stations during the frequency resources allocation therefor, which causes the problems such as frequency use conflicts or strong signal interferences among the base stations in different electronic shelf label systems, thereby leading to the reduction of the communication success rate or even the communication failure of the electronic shelf label systems.

It can be seen that in the prior art, the method for allocating frequencies to a plurality of base stations in an electronic shelf label system has the problems of frequency use conflicts or strong signal interferences among the base stations, which reduces the communication stability of the electronic shelf label system and cannot meet the actual needs of stores with a plurality of base stations.

SUMMARY

In a first aspect, the present disclosure provides a shelf label system. The shelf label system may include one or more electronic shelf labels, one or more base stations that communicate with the one or more electronic shelf labels, and a server that communicates with the one or more base stations. Furthermore, the server may be configured to: obtain a current weight degree for each base station based on a frequency interval weight between every two base stations in a current connectivity structure of each base station; obtain a current priority type for each base station based on base stations corresponding to respective docking tasks in a current batch docking task list and priority types of the docking tasks; obtain a current allocated frequency for each base station based on the current priority type of each base station, the current weight degree of each base station, the frequency interval weight and a current available frequency set; and instruct each base station to transmit a corresponding docking task to an electronic shelf label based on the current allocated frequency and to release the current allocated frequency such that during issuance of a next-round batch docking task list, each base station is dynamically re-allocated with a frequency based on the current available frequency set.

In a second aspect, the present disclosure provides a dynamic frequency allocation method for base stations. The method is applicable to a shelf label system and includes: obtaining, by a server in a shelf label system, a current weight degree for each base station based on a frequency interval weight between base stations in a current connectivity structure of each base station in the shelf label system; obtaining, by the server, a current priority type for each base station based on base stations corresponding to respective docking tasks in a current batch docking task list and priority types of the docking tasks; obtaining, by the server, a current allocated frequency for each base station based on the current priority type of each base station, the current weight degree of each base station, the frequency interval weight and a current available frequency set; and instructing, by the server, each base station to transmit a corresponding docking task to an electronic shelf label based on the current allocated frequency and to release the current allocated frequency such that during issuance of a next-round batch docking task list, each base station is dynamically re-allocated with a frequency based on the current available frequency set.

In a third aspect, the present disclosure provides a non-transitory computer readable storage medium storing a plurality of programs for execution by a server in a shelf label system, where the server has one or more processors, and the plurality of programs, when executed by the one or more processors, cause the server to perform acts including: obtaining a current weight degree for each base station based on a frequency interval weight between every two base stations in a current connectivity structure of each base station in the shelf label system; obtaining a current priority type for each base station based on base stations corresponding to respective docking tasks in a current batch docking task list and priority types of the docking tasks; obtaining a current allocated frequency for each base station based on the current priority type of each base station, the current weight degree of each base station, the frequency interval weight and a current available frequency set; and instructing each base station to transmit a corresponding docking task to an electronic shelf label based on the current allocated frequency and to release the current allocated frequency such that during issuance of a next-round batch docking task list, each base station is dynamically re-allocated with a frequency based on the current available frequency set.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Figure 1:
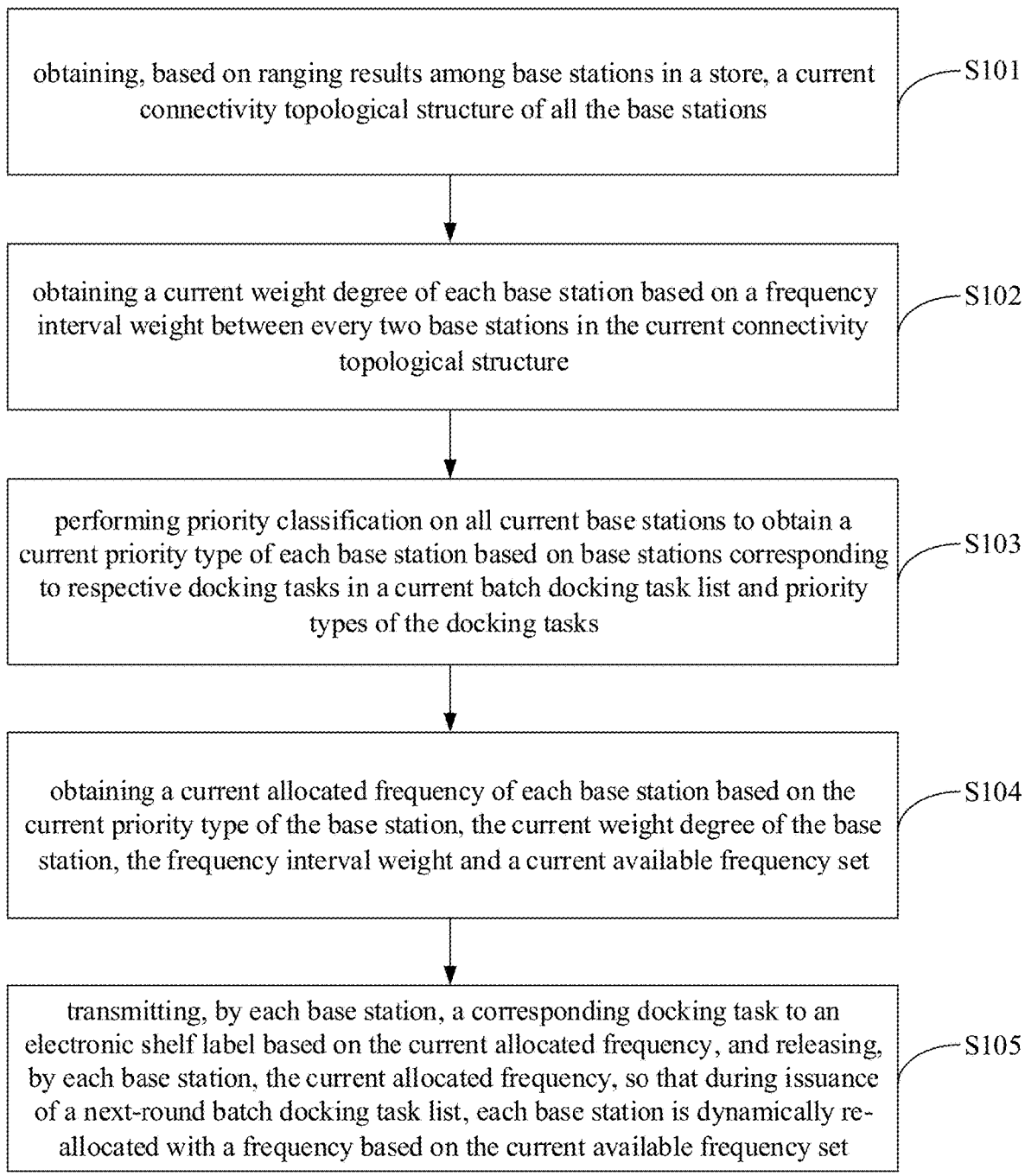
FIG. 1 illustrates a flowchart diagram of a dynamic frequency allocation method for a base station according to an example of the present disclosure.

Reference will now be made in detail to exemplary examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

Reference throughout this specification to "one example," "an example," "an example," "some examples," "some examples," or similar language means that a particular feature, structure, or characteristic described is included in at least one example or example. Features, structures, elements, or characteristics described in connection with one or some examples are also applicable to other examples, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the examples of the disclosure to describe the technical solutions of the examples of the disclosure clearly. Of course, those skilled in the art can understood that multiple examples provided in the examples of the disclosure can be executed independently, or can be combined with methods of the other examples in the examples of the disclosure for execution together, or may be executed independently or after combined with some methods in other related technologies. No limits are made thereto in the examples of the disclosure.

Aiming at the defects in the prior art, the present disclosure provides a dynamic frequency allocation method for a base station, a shelf label system and a computer device, which solves the problem in the prior art that the method for allocating frequencies to a plurality of base stations in an electronic shelf label system has frequency use conflicts or strong signal interferences among the base stations. The present disclosure not only meets different real-time requirements of customers for different task priorities, but also prevents the problems of frequency use conflicts and mutual interferences between the base stations and maximizes the communication throughput of the base stations in limited frequency resources, thereby improving the stability and the data throughput capacity of the electronic shelf label system.

According to some examples, the present disclosure provides a dynamic frequency allocation method for a base station, which specifically includes the following examples.

FIG. 1 illustrates a flowchart diagram of a dynamic frequency allocation method for a base station according to an example of the present disclosure. As illustrated in FIG. 1, when being applied to a shelf label system that includes a server, base stations and an electronic shelf label, the method specifically includes:

step S101: obtaining, based on ranging results among base stations in a store, a current connectivity topological structure of all the base stations.

Figure 2:
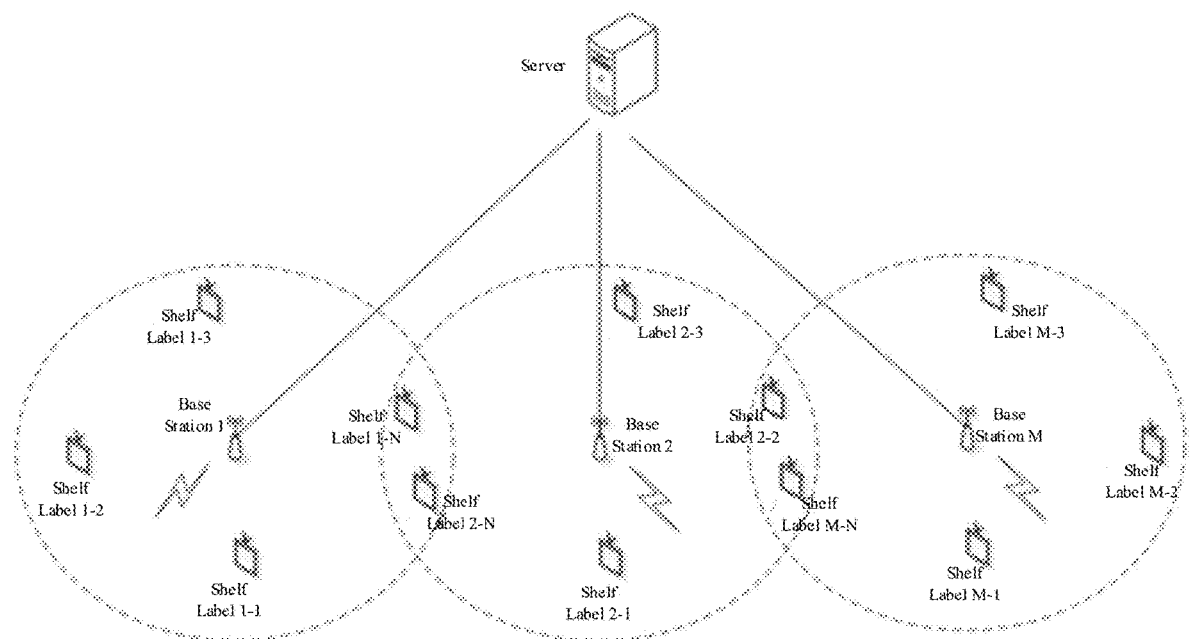
FIG. 2 illustrates a structural diagram of a shelf label system according to an example of the present disclosure.

It should be noted that, as illustrated in FIG. 2, in some examples, the shelf label system of each store includes a server, a plurality of base stations and a plurality of electronic shelf labels, and the server is configured to transmit trigger information or a control instruction to the electronic shelf labels through the base stations.

Figure 3:
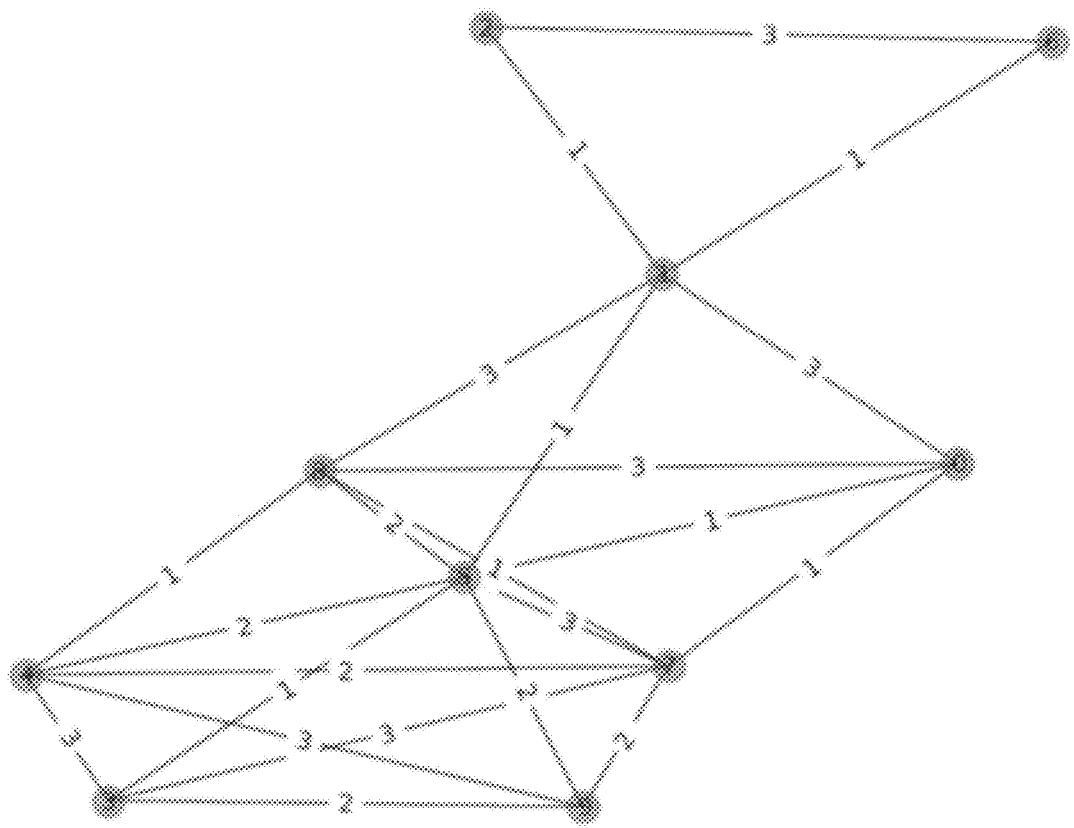
FIG. 3 illustrates a schematic diagram of a current connectivity topological structure according to an example of the present disclosure.

In some examples, the server controls or instructs all the base stations in the store to transmit ranging signals in turn, and obtains ranging results between each base station and other base stations based on intensity of feedback signals transmitted from the other base stations to the base station; the server then establishes a current connectivity topological structure of the base stations based on the ranging results among all the base stations. In the current connectivity topological structure, current connectivity structure of each base station may be provided. The current connectivity topological structure includes a frequency interval weight between two base stations, as illustrated in FIG. 3, where 0 to 9 in black circles represent a base station 0 to a base station 9, a frequency interval weight between the base station 0 and the base station 1 is 3, a frequency interval weight between the base station 0 and the base station 5 is 1, and a frequency interval weight between the base station 0 and the base station 6 is 0 since they are not connected. It should be noted that in order to prevent any signal interference between the base stations, the frequency interval weight between two base stations increases as the distance between the two base stations decreases.

step S102: obtaining a current weight degree of each base station based on a frequency interval weight between every two base stations in the current connectivity topological structure.

In some examples, a current base station is taken as a target node, all connected base stations connected to the target node are obtained based on the current connectivity topological structure, and the frequency interval weights between the target node and all connected base stations are accumulated to obtain a current weight degree of the current base station.

Taking the base station 1 as an example, in the current connectivity topological structure illustrated in FIG. 3, all the connected base stations connected to the base station 1 are the base station 0, the base station 6, the base station 2, the base station 8 and the base station 5 respectively. The frequency interval weights between the base station 1 and all the connected base stations are 3, 1, 1, 3, and 1 respectively, so the current weight of the base station 1 is: 3+1+1+3+1=9. By analogy, the current weight degrees of the respective base stations illustrated in FIG. 3 are given as follows in a descending order: 12 for the base station 5, 12 for the base station 7, 11 for the base station 4, 10 for the base station 8, 9 for the base station 1, 9 for the base station 3, 9 for the base station 9, 8 for the base station 0, 4 for the base station 2, and 4 for the base station 6.

In some examples, the larger the current weight degree of the base station, the more or closer other base stations are connected to the base station, and the stronger the interference.

step S103: performing priority classification on all current base stations to obtain a current priority type of each base station based on base stations corresponding to respective docking tasks in a current batch docking task list and priority types of the docking tasks.

In some examples, the current batch docking task list includes the base station corresponding to each docking task and the priority type of each docking task. The docking task includes, but is not limited to, a commodity binding task, a commodity attribute modification task, a lamp flashing task and a page switching task. The priority type includes, but is not limited to, high and low priorities.

It should be noted that in some examples, the priority type of each base station is the same as that of the corresponding docking task, i.e., when the docking task is of high priority, the corresponding base station is also of high priority. In FIG. 3, for example, the base stations with the priority type of high priority are the base station 0, the base station 1, the base station 2, and the base station 3, and the base stations with the priority type of low priority are the base station 4, the base station 5, the base station 6, the base station 7, the base station 8, and the base station 9.

step S104: obtaining a current allocated frequency of each base station based on the current priority type of the base station, the current weight degree of the base station, the frequency interval weight and a current available frequency set.

Figure 4:
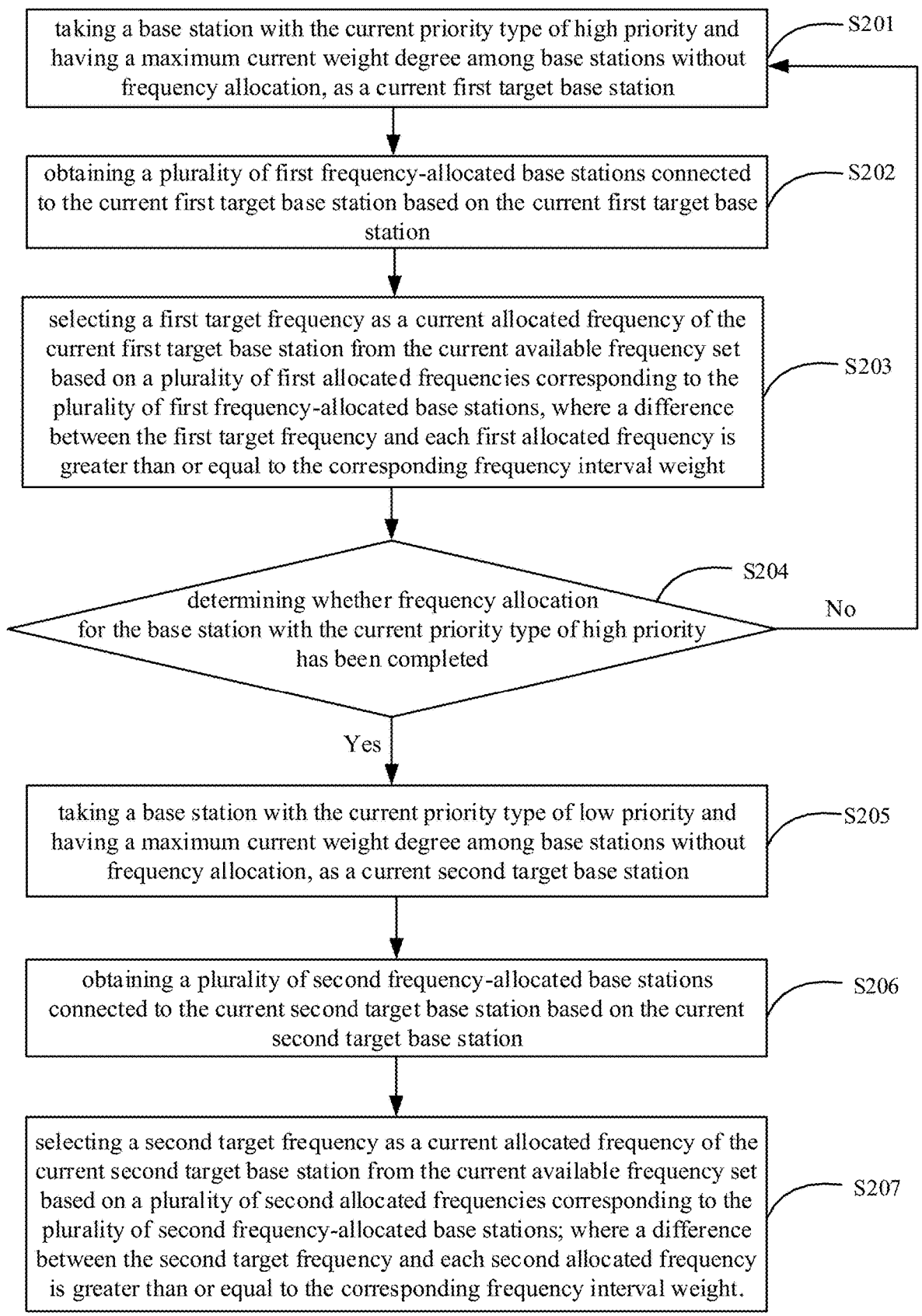
FIG. 4 illustrates a specific flowchart diagram of step S104 in FIG. 1.

As illustrated in FIG. 4, in some examples, performing priority classification on all current base stations to obtain a current priority type of each base station based on base stations corresponding to respective docking tasks in a current batch docking task list and priority types of the docking tasks specifically includes:

step S201: taking a base station with the current priority type of high priority and having a maximum current weight degree among base stations without frequency allocation, as a current first target base station;

step S202: obtaining a plurality of first frequency-allocated base stations connected to the current first target base station based on the current first target base station;

step S203: selecting a first target frequency as a current allocated frequency of the current first target base station from the current available frequency set based on a plurality of first allocated frequencies corresponding to the plurality of first frequency-allocated base stations, where a difference between the first target frequency and each first allocated frequency is greater than or equal to the corresponding frequency interval weight;

step S204: determining whether frequency allocation for the base station with the current priority type of high priority has been completed, and if so, performing step S205, or if not, performing step S201;

step S205: taking a base station with the current priority type of low priority and having a maximum current weight degree among base stations without frequency allocation, as a current second target base station;

step S206: obtaining a plurality of second frequency-allocated base stations connected to the current second target base station based on the current second target base station;

step S207: selecting a second target frequency as a current allocated frequency of the current second target base station from the current available frequency set based on a plurality of second allocated frequencies corresponding to the plurality of second frequency-allocated base stations; where a difference between the second target frequency and each second allocated frequency is greater than or equal to the corresponding frequency interval weight.

As can be seen from FIG. 3, in some examples, if the available frequency set includes frequency 0, frequency 1, frequency 2, frequency 3, and frequency 4;

the base stations with the current priority type of high priority are the base station 0, the base station 1, the base station 2, and the base station 3;

the base stations with the current priority type of low priority are the base station 4, the base station 5, the base station 6, the base station 7, the base station 8, and the base station 9;

the current weight degrees of the base stations are given as follows in a descending order: 12 for the base station 5, 12 for the base station 7, 11 for the base station 4, 10 for the base station 8, 9 for the base station 1, 9 for the base station 3, 9 for the base station 9, 8 for the base station 0, 4 for the base station 2, and 4 for the base station 6.

It should be noted that firstly, frequency allocations are performed for four base stations with high priority according to the current priority types of the base stations, and the specific allocation steps are as follows:

1) finding out the base station 1 with a maximum current weight degree among the four base stations with high priority, and taking the base station 1 as the current first target base station;
2) since the current base station 1 is the first base station to be subjected to frequency allocation and there is no first frequency-allocated base station connected thereto, the base station 1 is allocated with frequency 0;
3) continuing to find out the base station 3 with a maximum current weight degree among the remaining three base stations with high priority without frequency allocation, and taking the base station 3 as the current first target base station;
4) as can be seen from FIG. 3, the base station 1 is not connected to the base station 3, so the base station 3 is also allocated with frequency 0;
5) continuing to find out the base station 0 with a maximum current weight degree among the remaining two base stations with high priority and without frequency allocation, and taking the base station 0 as the current first target base station;
6) as can be seen from FIG. 3, the frequency-allocated base stations connected to the base station 0 include the base station 1, and the frequency interval weight between the base station 0 and the base station 1 is 3, then frequency 3 is selected from the available frequency set as the current allocated frequency of the base station 0, thereby satisfying a condition that a frequency difference between the base station 0 and the base station 1 is greater than or equal to a corresponding frequency interval weight;
7) allocating a frequency to the last base station 2 with high priority. since the frequency-allocated base station connected to the base station 2 is the base station 1, and the frequency interval weight between the base station 1 and the base station 2 is 1, selecting any one of frequencies 1, 2 and 3 as the current allocated frequency of the base station 2 from the available frequency set. In this example, frequency 1 is taken as an example.

Therefore, after the frequency allocations for the four base stations with high priority are completed according to the above steps, frequency allocations are sequentially performed for six base stations with low priority according to the above steps. Since the allocation principle is the same, the relevant description is omitted here.

step S105: transmitting, by each base station, a corresponding docking task to an electronic shelf label based on a current allocated frequency, and releasing, by each base station, the current allocated frequency, so that during issuance of a next-round batch docking task list, each base station is dynamically re-allocated with a frequency based on the current available frequency set.

It should be noted that after obtaining the current allocated frequency, each base station transmits relevant docking tasks based on the current allocated frequency, and thereafter releases the current allocated frequency, so that during transmission of a next round of batch docking tasks, each base station is re-allocated with a frequency, thereby realizing the dynamic frequency allocation for the base stations.

Compared with the prior art, this example has the following advantageous effects:

1. In some examples, priority classification is performed on all current base stations to obtain a current priority type of each base station based on base stations corresponding to respective docking tasks in a current batch docking task list and priority types of the docking tasks, and each base station is allocated with a frequency based on the current priority type thereof, thereby meeting different real-time requirements of the customers for different task priorities.

2. In some examples, a current weight degree of each base station is obtained based on a frequency interval weight between every two base stations in the current connectivity topological structure, then frequency allocation is performed for the current available frequency set based on the current weight degree of each base station and the frequency interval weight, which not only prevents the problems of frequency use conflicts and mutual interferences between the base stations, but also maximizes the communication throughput of the base stations in limited frequency resources, improves the frequency utilization rate and reduces the time of issuance of the batch docking tasks.

3. In some examples, each base station transmits a corresponding docking task to an electronic shelf label based on a current allocated frequency, and then releases the current allocated frequency, so that during issuance of a next-round batch docking task list, each base station is re-allocated with a frequency based on the current available frequency set, thereby realizing dynamic frequency allocation for the base stations based on the change of the batch task list, and further solving the problems of frequency use conflicts and mutual interferences between the base stations.

In another example of the present disclosure, if the first target frequency or the second target frequency is not existed in the current available frequency set, a docking task corresponding to the current first target base station or the current second target base station is stored in a current unfinished task list; and a task integration is performed on the current unfinished task list and a next-round docking task list newly received to obtain a next-round batch docking task list.

It should be noted that there may be situations where frequencies cannot be allocated to the base stations with high priority and base stations with low priority. For example, when the base station 4 is taken as the current second target base station, the frequency-allocated base stations connected to the base station 4 are the base station 3 and the base station 0, the frequency interval weight between the base station 4 and the base station 3 is 3, the frequency interval weight between the base station 4 and the base station 0 is 1. However, the allocated frequency of the base station 0 is 3, and the allocated frequency of the base station 3 is 0. It is impossible to select, from frequencies 0, 1, 2 and 3 in the available frequency set, a frequency which has both a difference greater than or equal to 1 from the frequency of the base station 0, and a difference greater than or equal to 3 from the frequency of the base station 3, so the base station 4 cannot get a frequency in the current round of frequency allocation, and the docking task corresponding to the base station 4 also cannot be issued in the current round.

Further, a docking task corresponding to the current first target base station or the current second target base station without a successful frequency allocation in the current round is stored in the current unfinished task list, and a task integration is performed on the current unfinished task list and a next-round docking task list newly received, to obtain a next-round docking task list which enables dynamic frequency allocation for the corresponding base stations according to the dynamic frequency allocation steps in the above example.

In this example, the task integration includes, but is not limited to, adjusting the priority type of each task in the current unfinished task list to high priority.

In another example of the present disclosure, the method further includes: scanning, by each base station in the store, each frequency point in a preset frequency set to obtain signal scanning power of each base station for each frequency point; comparing each signal scanning power with a preset threshold power, and forming the current available frequency set using the frequency points corresponding to the signal scanning power less than the preset threshold power.

It should be noted that in some examples, the preset frequency set includes a plurality of frequencies allocated for the shelf label system of the store. A background server schedules each base station to scan each frequency in the preset frequency set; the base station feeds the signal power received at each frequency back to the background server; and the background server selects, based on the signal power at each frequency fed back by each base station, the frequencies corresponding to the signal powers less than the preset threshold power to form an available frequency set.

In some examples, the present disclosure provides a shelf label system, which specifically includes a server, base stations and an electronic shelf label. The server is configured to obtain, based on ranging results among base stations in a store, a current connectivity topological structure of all the base stations. The server is further configured to obtain a current weight degree of each base station based on a frequency interval weight between every two base stations in the current connectivity topological structure. The server is further configured to perform priority classification on all current base stations to obtain a current priority type of each base station based on base stations corresponding to respective docking tasks in a current batch docking task list and priority types of the docking tasks. The server is further configured to obtain a current allocated frequency of each base station based on the current priority type of the base station, the current weight degree of the base station, the frequency interval weight and a current available frequency set. Each base station is configured to transmit a corresponding docking task to an electronic shelf label based on a current allocated frequency, and further configured to release the current allocated frequency after transmitting the corresponding docking task, so that during issuance of a next-round batch docking task list, each base station is dynamically re-allocated with a frequency based on the current available frequency set.

In some examples, the present disclosure provides a computer device, including a memory, a processor and a computer program stored in the memory and executable on the processor. The processor is configured to execute the computer program to implement the steps of: obtaining, based on ranging results among base stations in a store, a current connectivity topological structure of all the base stations; obtaining a current weight degree of each base station based on a frequency interval weight between every two base stations in the current connectivity topological structure; performing priority classification on all current base stations to obtain a current priority type of each base station based on base stations corresponding to respective docking tasks in a current batch docking task list and priority types of the docking tasks; obtaining a current allocated frequency of each base station based on the current priority type of the base station, the current weight degree of the base station, the frequency interval weight and a current available frequency set; and transmitting, by each base station, a corresponding docking task to an electronic shelf label based on the current allocated frequency, and releasing, by each base station, the current allocated frequency, so that during issuance of a next-round batch docking task list, each base station is dynamically re-allocated with a frequency based on the current available frequency set.

Those of ordinary skills in the art can understand that all or part of the flows in the aforementioned method examples can be completed by instructing relevant hardware through a computer program that may be stored in a nonvolatile computer-readable storage medium, and when executed, the program can include the flows of the aforementioned method examples. In which, any reference to a memory, a storage, a database or any other medium adopted in the examples of the present disclosure can include a non-volatile memory and/or a volatile memory. The nonvolatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache memory. By way of illustration rather than limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synch-link DRAM (SL-DRAM), a memory bus (Rambus) direct RAM (RDRAM), a direct memory bus dynamic RAM (DRDRAM) and a memory bus dynamic RAM (RDRAM).

Compared with the prior art, the present disclosure has the following advantageous effects:

1. In some examples of the present disclosure, priority classification is performed on all current base stations to obtain a current priority type of each base station based on base stations corresponding to respective docking tasks in a current batch docking task list and priority types of the docking tasks, and each base station is allocated with a frequency according to the current priority type thereof, thereby meeting different real-time requirements of the customers for different task priorities.

2. In some examples of the present disclosure, a current weight degree of each base station is obtained based on a frequency interval weight between every two base stations in the current connectivity topological structure, then frequency allocation is performed for the current available frequency set based on the current weight degree of each base station and the frequency interval weight, which not only prevents the problems of frequency use conflicts and mutual interferences between the base stations, but also maximizes the communication throughput of the base stations in limited frequency resources, improves the frequency utilization rate and reduces the time of issuance of the batch docking tasks.

3. In some examples of the present disclosure, each base station transmits a corresponding docking task to an electronic shelf label based on a current allocated frequency, and then releases the current allocated frequency, so that during issuance of a next-round batch docking task list, each base station is dynamically re-allocated with a frequency based on the current available frequency set, thereby realizing dynamic frequency allocation for the base stations based on the change of the batch task list, and further solving the problems of frequency use conflicts and mutual interferences between the base stations.

It should be noted that herein, the relational terms such as "first" and "second" are only used to distinguish one entity or operation from another entity or operation, and do not necessarily require or imply any such actual relationship or sequence between these entities or operations. In addition, the term "comprise," "include" or any other variation thereof is intended to cover non-exclusive inclusions, so that a process, method, article or device that includes a series of elements includes not only those elements, but also other elements not explicitly listed, or further includes elements inherent to such process, method, article or device. Without further restrictions, an element defined by a statement "comprising a . . . " does not exclude the existence of other identical elements in a process, method, article or device that includes said element.

What is claimed is:

1. A shelf label system, comprising:
one or more electronic shelf labels;
one or more base stations that communicate with the one or more electronic shelf labels; and
a server that communicates with the one or more base stations and is configured to:
obtain a current weight degree for each base station based on a frequency interval weight between base stations in a current connectivity structure of each base station;
obtain a current priority type for each base station based on base stations corresponding to docking tasks in a current batch docking task list and priority types of the docking tasks;
obtain a current allocated frequency for each base station based on the current priority type, the current weight degree, the frequency interval weight and a current available frequency set; and
instruct each base station to transmit a corresponding docking task to an electronic shelf label based on the current allocated frequency and to release the current allocated frequency such that during issuance of a next-round batch docking task list, each base station is dynamically re-allocated with a frequency based on the current available frequency set.

2. The shelf label system according to claim 1, wherein the server is further configured to:
instruct each base stations located in a store to transmit ranging signals to obtain ranging results; and
obtain the current connectivity structure of the one or more base stations based on the ranging results.

3. The shelf label system according to claim 2, wherein the server is configured to:
instruct each base station to scan each frequency point in a preset frequency set to obtain signal scanning power of each base station for each frequency point; and
compare each signal scanning power with a preset threshold power, and form the current available frequency set using the frequency points corresponding to the signal scanning power less than the preset threshold power.

4. The shelf label system according to claim 2, wherein the server is further configured to:
control the one or more base stations to transmit the ranging signals in turn;
obtain the ranging results between each base station and other base stations based on intensity of feedback signals transmitted from the other base stations to each base station; and
establish the current connectivity topological structure of the one or more base stations based on the ranging results among all the one or more base stations.

5. The shelf label system according to claim 1, wherein the server is further configured to:
take a base station with a high priority and having a maximum current weight degree among base stations without frequency allocation, as a current first target base station;
obtain a plurality of first frequency-allocated base stations connected to the current first target base station based on the current first target base station; and
select a first target frequency as a current allocated frequency of the current first target base station from the current available frequency set based on a plurality of first allocated frequencies corresponding to the plurality of first frequency-allocated base stations, wherein a difference between the first target frequency and each first allocated frequency is greater than or equal to a corresponding frequency interval weight.

6. The shelf label system according to claim 5, wherein the server is further configured to:
after frequency allocation for the base station with the high priority is completed, take a base station with a low priority and having a maximum current weight degree among the base stations without frequency allocation, as a current second target base station;
obtain a plurality of second frequency-allocated base stations connected to the current second target base station based on the current second target base station; and
select a second target frequency as a current allocated frequency of the current second target base station from the current available frequency set based on a plurality of second allocated frequencies corresponding to the plurality of second frequency-allocated base stations, wherein a difference between the second target frequency and each second allocated frequency is greater than or equal to a corresponding frequency interval weight.

7. The shelf label system according to claim 6, wherein the server is further configured to:
in response to determining that the first target frequency or the second target frequency is not existed in the current available frequency set, store a docking task corresponding to the current first target base station or the current second target base station in a current unfinished task list; and
obtain an integrated next-round batch docking task list by performing a task integration on the current unfinished task list and a next-round docking task list received.

8. The shelf label system according to claim 7, wherein the task integration comprises:
adjusting a priority type of each task in the current unfinished task list to high priority.

9. The shelf label system according to claim 1, wherein the server is further configured to:
take a current base station as a target node, and obtain all connected base stations connected to the target node based on the current connectivity topological structure; and
accumulate the frequency interval weights between the target node and the all connected base stations to obtain a current weight degree of the current base station.

10. A method for dynamic frequency allocation, comprising:
obtaining, by a server in a shelf label system, a current weight degree for each base station based on a frequency interval weight between base stations in a current connectivity structure of each base station in the shelf label system;
obtaining, by the server, a current priority type for each base station based on base stations corresponding to docking tasks in a current batch docking task list and priority types of the docking tasks;
obtaining, by the server, a current allocated frequency for each base station based on the current priority type, the current weight degree, the frequency interval weight and a current available frequency set; and
instructing, by the server, each base station to transmit a corresponding docking task to an electronic shelf label based on the current allocated frequency and to release the current allocated frequency such that during issuance of a next-round batch docking task list, each base station is dynamically re-allocated with a frequency based on the current available frequency set.

11. The method according to claim 10, further comprising:
instructing, by the server, one or more base stations located in a store to transmit ranging signals to obtain ranging results; and
obtaining, by the server, the current connectivity topological structure of the one or more base stations based on the ranging results.

12. The method according to claim 11, further comprising:
instructing, by the server, the one or more base stations to scan each frequency point in a preset frequency set to obtain signal scanning power of each base station for each frequency point; and
comparing, by the server, each signal scanning power with a preset threshold power and form the current available frequency set using the frequency points corresponding to the signal scanning power less than the preset threshold power.

13. The method according to claim 11, further comprising:
controlling, by the server, the one or more base stations to transmit the ranging signals in turn;
obtaining, by the server, the ranging results between each base station and other base stations based on intensity of feedback signals transmitted from the other base stations to each base station; and
establishing, by the server, the current connectivity topological structure of the one or more base stations based on the ranging results among all the one or more base stations.

14. The method according to claim 10, further comprising:
taking, by the server, a base station with a high priority and having a maximum current weight degree among base stations without frequency allocation, as a current first target base station;

obtaining, by the server, a plurality of first frequency-allocated base stations connected to the current first target base station based on the current first target base station; and selecting, by the server, a first target frequency as a current allocated frequency of the current first target base station from the current available frequency set based on a plurality of first allocated frequencies corresponding to the plurality of first frequency-allocated base stations, wherein a difference between the first target frequency and each first allocated frequency is greater than or equal to a corresponding frequency interval weight.

15. The method according to claim 14, further comprising:

after frequency allocation for the base station with the high priority is completed, taking, by the server, a base station with a low priority and having a maximum current weight degree among the base stations without frequency allocation, as a current second target base station;

obtaining, by the server, a plurality of second frequency-allocated base stations connected to the current second target base station based on the current second target base station; and selecting, by the server, a second target frequency as a current allocated frequency of the current second target base station from the current available frequency set based on a plurality of second allocated frequencies corresponding to the plurality of second frequency-allocated base stations, wherein a difference between the second target frequency and each second allocated frequency is greater than or equal to a corresponding frequency interval weight.

16. The method according to claim 15, further comprising:

in response to determining that the first target frequency or the second target frequency is not existed in the current available frequency set, storing, by the server, a docking task corresponding to the current first target base station or the current second target base station in a current unfinished task list; and obtaining, by the server, an integrated next-round batch docking task list by performing a task integration on the current unfinished task list and a next-round docking task list received.

17. The method according to claim 16, wherein the task integration is performed by:

adjusting a priority type of each task in the current unfinished task list to high priority.

18. The method according to claim 10, further comprising:

taking, by the server, a current base station as a target node, and obtaining, by the server, all connected base stations connected to the target node based on the current connectivity topological structure; and accumulating, by the server, the frequency interval weights between the target node and the all connected base stations to obtain a current weight degree of the current base station.

19. A non-transitory computer readable storage medium storing a plurality of programs for execution by a server in a shelf label system, wherein the server has one or more processors, and the plurality of programs, when executed by the one or more processors, cause the server to perform acts comprising:

obtaining a current weight degree for each base station based on a frequency interval weight between base stations in a current connectivity structure of each base station in the shelf label system;

obtaining a current priority type for each base station based on base stations corresponding to docking tasks in a current batch docking task list and priority types of the docking tasks;

obtaining a current allocated frequency for each base station based on the current priority type, the current weight degree, the frequency interval weight and a current available frequency set; and instructing each base station to transmit a corresponding docking task to an electronic shelf label based on the current allocated frequency and to release the current allocated frequency such that during issuance of a next-round batch docking task list, each base station is dynamically re-allocated with a frequency based on the current available frequency set.

20. The non-transitory computer readable storage medium according to claim 19, wherein the server is caused to perform acts further comprising:

instructing one or more base stations located in a store to transmit ranging signals to obtain ranging results; and obtaining the current connectivity topological structure of the one or more base stations based on the ranging results.

* * * * *